(12) United States Patent
Liu

(10) Patent No.: US 11,138,754 B2
(45) Date of Patent: Oct. 5, 2021

(54) QUEUE ANALYZING METHOD AND IMAGE MONITORING APPARATUS

(71) Applicant: VIVOTEK INC., New Taipei (TW)

(72) Inventor: Cheng-Chieh Liu, New Taipei (TW)

(73) Assignee: VIVOTEK INC., New Taipei (TW)

(*) Notice: Subject to any disclaimer, the term of this patent is extended or adjusted under 35 U.S.C. 154(b) by 96 days.

(21) Appl. No.: 16/831,849

(22) Filed: Mar. 27, 2020

(65) Prior Publication Data
US 2021/0174536 A1   Jun. 10, 2021

(30) Foreign Application Priority Data
Dec. 10, 2019 (TW) .................. 108145005

(51) Int. Cl.
G06T 7/70       (2017.01)
G06K 9/32       (2006.01)
G06F 16/53      (2019.01)

(52) U.S. Cl.
CPC ............ *G06T 7/70* (2017.01); *G06F 16/53* (2019.01); *G06K 9/3233* (2013.01); *G06T 2207/30204* (2013.01); *G06T 2207/30242* (2013.01)

(58) Field of Classification Search
CPC ............ G06T 7/70; G06T 2207/30204; G06T 2207/30242; G06K 9/3233; G06K 9/00778; G06F 16/53

USPC .......................................... 382/103
See application file for complete search history.

(56) References Cited

U.S. PATENT DOCUMENTS

| 2005/0117778 | A1  | 6/2005 | Crabtree |             |
|--------------|-----|--------|----------|-------------|
| 2011/0135147 | A1* | 6/2011 | Eswara   | G06T 7/174  |
|              |     |        |          | 382/103     |
| 2013/0182905 | A1* | 7/2013 | Myers    | A61B 5/1113 |
|              |     |        |          | 382/103     |

FOREIGN PATENT DOCUMENTS

CN      107153819 A    9/2017

* cited by examiner

*Primary Examiner* — Amandeep Saini
(74) *Attorney, Agent, or Firm* — Winston Hsu

(57) ABSTRACT

A queue analyzing method is applied to an image monitoring apparatus and can automatically generate an interval threshold according to position variation of objects. The queue analyzing method includes computing a plurality of intervals between all objects inside an image, dividing the plurality of intervals at least into a first group corresponding to a low interval range and a second group corresponding to a high interval range, computing an interval mean value and an interval amending value of objects inside the first group, utilizing the interval mean value and the interval amending value to generate the interval threshold, and marking some adjacent objects conforming to the interval threshold within the image.

20 Claims, 8 Drawing Sheets

QUEUE ANALYZING METHOD AND IMAGE MONITORING APPARATUS

BACKGROUND OF THE INVENTION

1. Field of the Invention

The present invention relates to a queue analyzing method and an image monitoring apparatus, and more particularly, to a queue analyzing method capable of automatically generating an interval threshold for queue analysis according to position variation of objects and a related image monitoring apparatus.

2. Description of the Prior Art

A conventional queue analyzing method sets a distance threshold with a fixed number for object statistic and queue analysis. If the distance threshold is a large number, some person which does not queue but is nearby the queued person may be counted in the queue as a mistake; if the distance threshold is a small number, some person which is in the queue but distant from an adjacent person may be excluded from the queue, so that the queue is cut off or shortened and a length of the queue is misjudged. In addition, a monitoring image captured by the monitoring apparatus cannot be used to determine whether the distance threshold with the fixed number is suitable for a situation where the monitoring apparatus belongs to. Thus, design of a queue analyzing method capable of automatically setting the proper distance threshold via object analyzing statistic result inside the monitoring image is an important issue in the monitoring industry.

SUMMARY OF THE INVENTION

The present invention provides a queue analyzing method capable of automatically generating an interval threshold for queue analysis according to position variation of objects and a related image monitoring apparatus for solving above drawbacks.

According to the claimed invention, a queue analyzing method of automatically generating an interval threshold for queue analysis in accordance with position variation of objects is disclosed. The queue analyzing method includes computing a plurality of intervals between all the objects inside an image, dividing the plurality of intervals at least into a first group corresponding to a low interval range and a second group corresponding to a high interval range, computing an interval mean value and an interval amending value of objects inside the first group, utilizing the interval mean value and the interval amending value to generate the interval threshold, and marking adjacent objects conforming to the interval threshold inside the image.

According to the claimed invention, an image monitoring apparatus includes an image receiver and an operation processor. The image receiver is adapted to receive an image. The operation processor is electrically connected to the image receiver and adapted to analyze the image for finding all objects. The operation processor is further adapted to compute a plurality of intervals between all the objects inside an image, divide the plurality of intervals at least into a first group corresponding to a low interval range and a second group corresponding to a high interval range, compute an interval mean value and an interval amending value of objects inside the first group, utilize the interval mean value and the interval amending value to generate the interval threshold, and mark adjacent objects conforming to the interval threshold inside the image.

The image monitoring apparatus and the queue analyzing method of the present invention utilizes statistic result about object intervals to sift out the interval corresponding to the low interval range, and the interval corresponds to the low interval range can be used to compute the interval threshold. Therefore, the objects distant from the queue can be excluded by the queue analyzing method, and only the intervals between the adjacent objects in the queue can be used to automatically provide the proper interval threshold, and to ensure correct of the queue analyzing result. Besides, the image monitoring apparatus can display the queue analyzing result on the screen, so that the user can clearly watch an effect of the interval threshold generated by the queue analyzing method, and may manually adjust the interval threshold according to personal habit, or remove some objects for automatic adjustment of the preferred interval threshold, or reserve some objects for utilizing the reserved objects to generate the preferred interval threshold, or draw the region of interest and/or the stretching region in the image for easily determining relation between each object and the whole queue.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
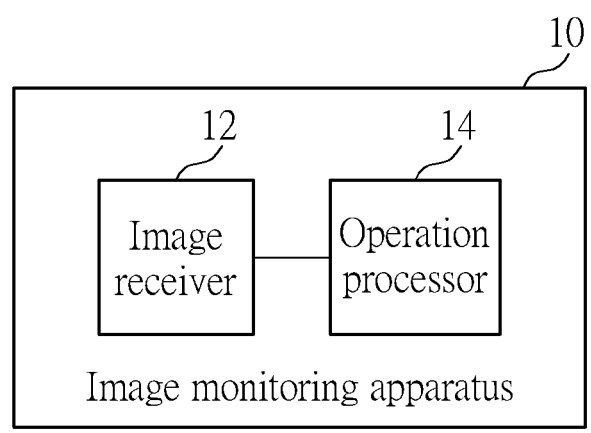
FIG. 1 is a functional block diagram of an image monitoring apparatus according to an embodiment of the present invention.
Figure 2:
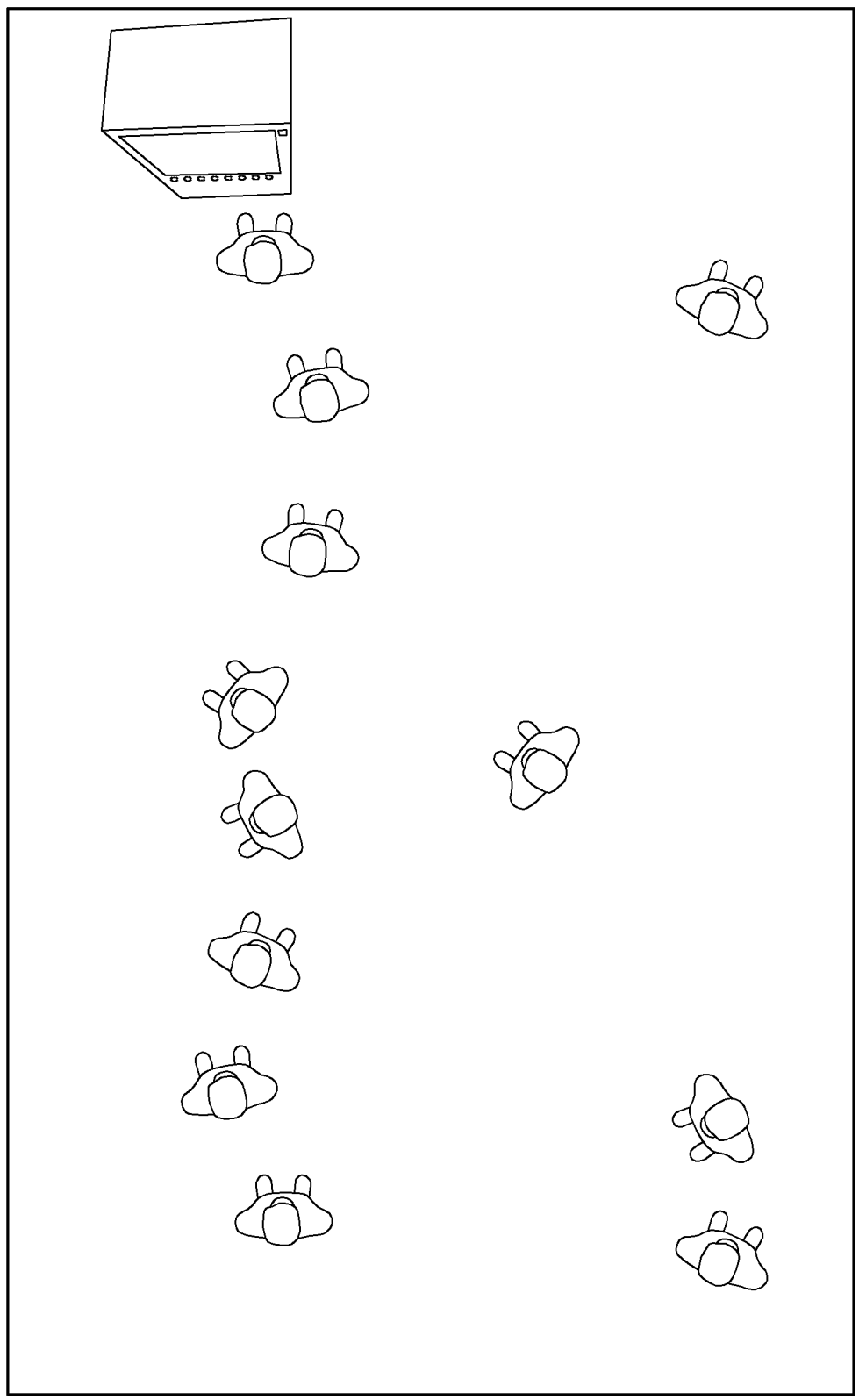
FIG. 2 is a diagram of an image acquired by the image monitoring apparatus according to the embodiment of the present invention.
Figure 3:
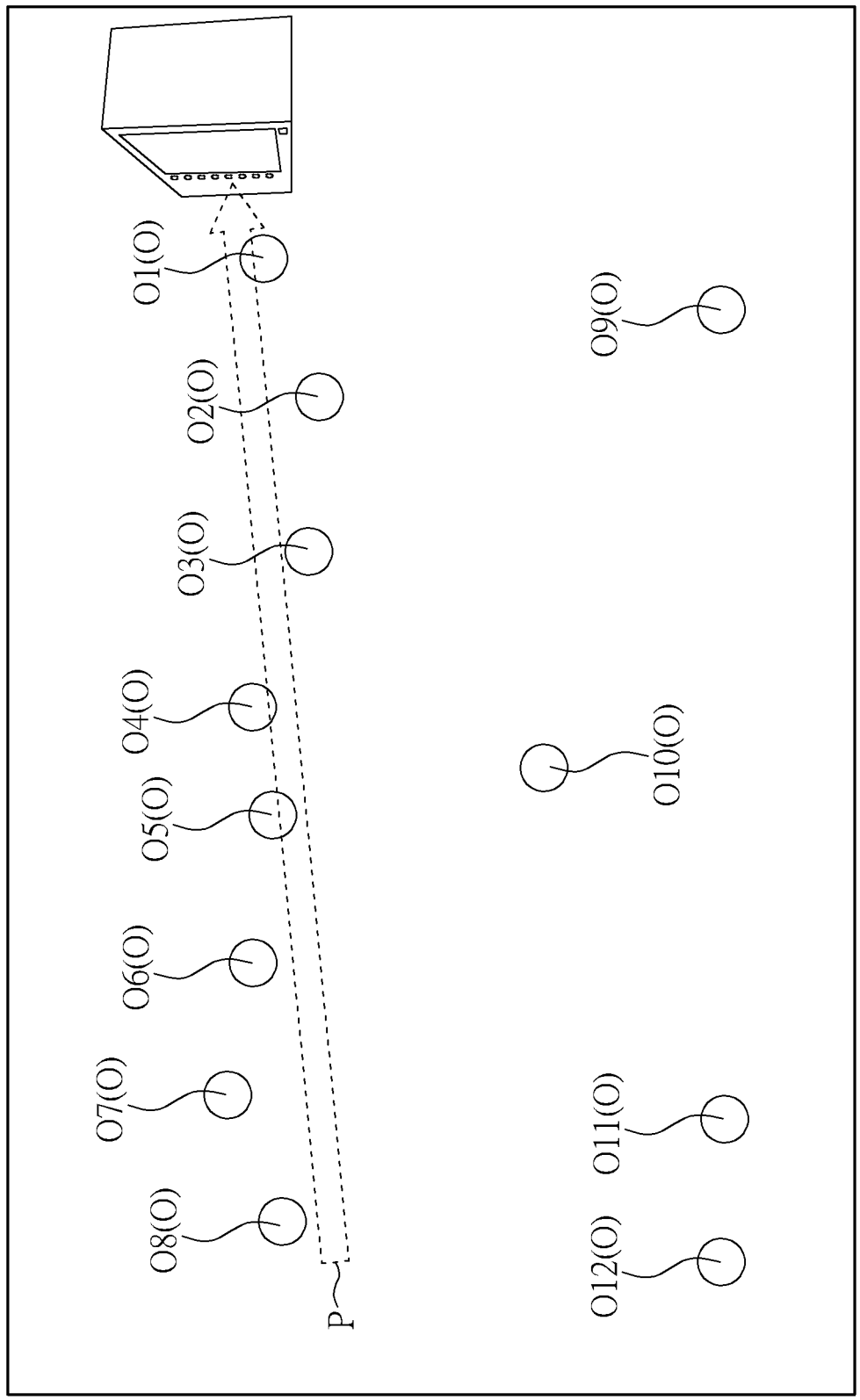
FIG. 3 is a diagram of the image processed by object marking shown in FIG. 2.

Please refer to FIG. 1 to FIG. 3. FIG. 1 is a functional block diagram of an image monitoring apparatus 10 according to an embodiment of the present invention. FIG. 2 is a diagram of an image I acquired by the image monitoring apparatus 10 according to the embodiment of the present invention. FIG. 3 is a diagram of the image I processed by object marking shown in FIG. 2. The image monitoring apparatus 10 can include an image receiver 12 and an operation processor 14. The image receiver 12 can directly capture the image I covering a monitoring range of the image monitoring apparatus 10, or receive the image I captured by an external camera. The operation processor 14 can be electrically connected to the image receiver 12 in a wireless manner or in a wire manner. The operation processor 14 can analyze the image I to find out all objects O, and automatically generate an interval threshold according to position variation of the objects O for queue analysis.

Figure 4:
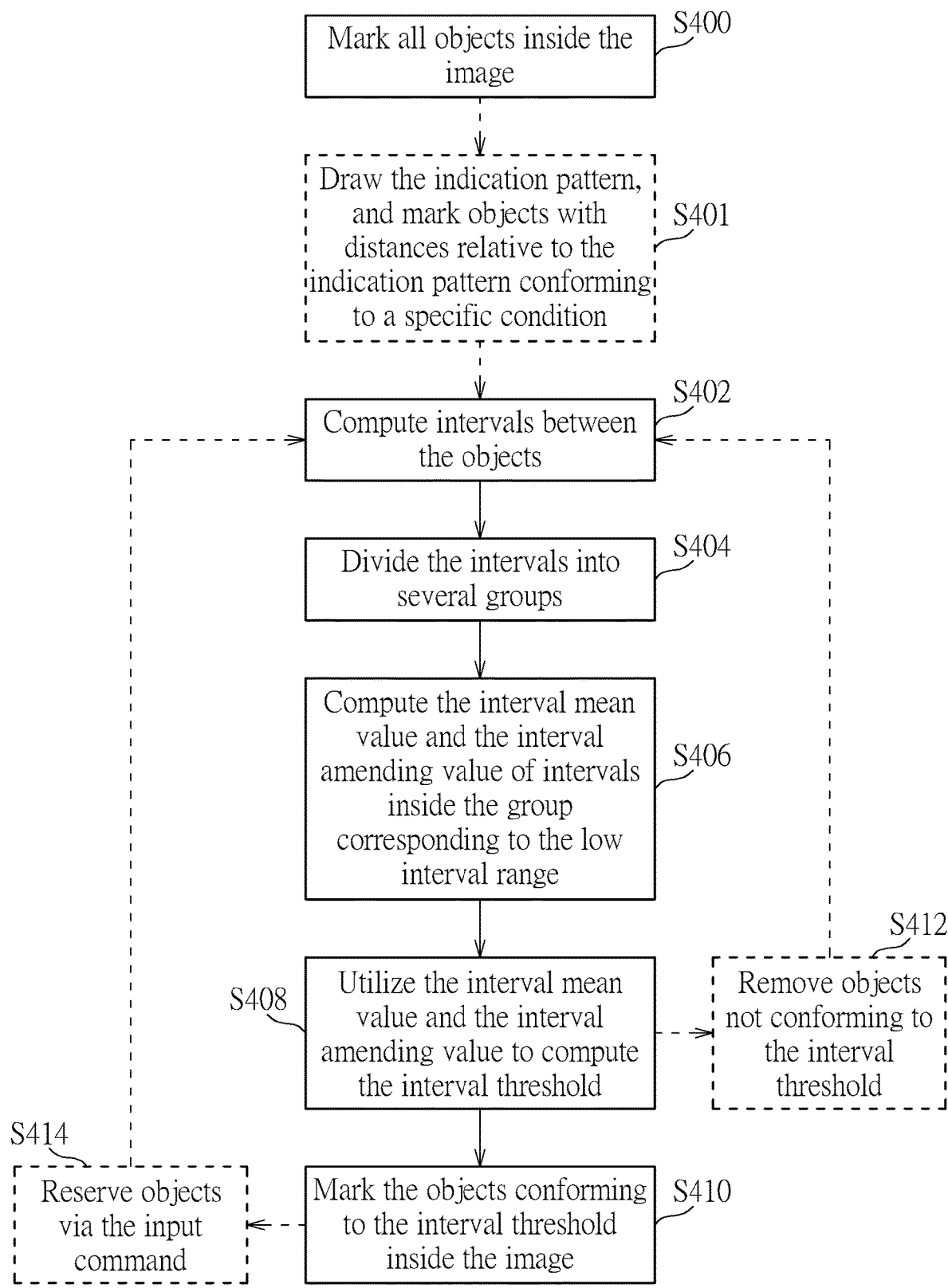
FIG. 4 is a flow chart of a queue analyzing method according to the embodiment of the present invention.
Figure 5:
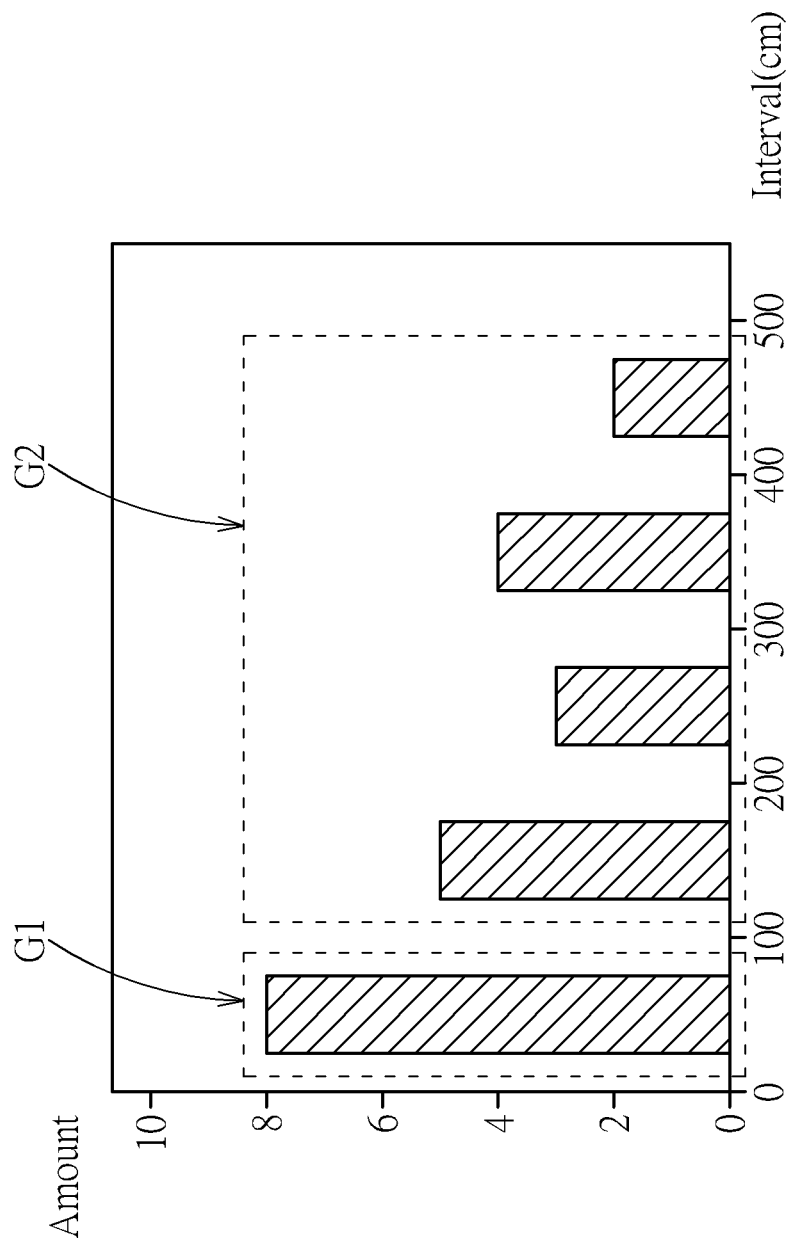
FIG. 5 is a diagram of one histogram formed by intervals of all the objects according to the embodiment of the present invention.

Please refer to FIG. 1 to FIG. 5. FIG. 4 is a flow chart of a queue analyzing method according to the embodiment of the present invention. FIG. 5 is a diagram of one histogram formed by intervals of all the objects O according to the embodiment of the present invention. The queue analyzing method illustrated in FIG. 4 can be suitable for the image monitoring apparatus 10 shown in FIG. 1. In the queue analyzing method, steps S400 and S402 can be executed for a start, and the operation processor 14 can analyze the image I to mark all the objects O inside the image I, and then compute a plurality of intervals between the objects O. For example, the queue analyzing method may compute eleven intervals between the object O1 and the objects O2~O12, and ten intervals between the object O2 and the objects O3~O12, and nine intervals between the object O3 and the objects O4~O12, and so on. The queue analyzing method can preset several interval ranges to classify the plurality of intervals, for determining how many intervals can be covered by each interval range. As shown in FIG. 5, the histogram has the transverse axle representing the length unit and the lengthwise axle representing the amount unit; some intervals within a low interval range have less number, and other intervals within a high interval range have more number, which depend on an actual situation.

The said interval can be acquired by two ways in step S402. In a first application, one object inside the image I can be selected, such as the object O1, and then all distances between the object O1 and the other objects O2~O12 can be directly computed; the distances between each object O and the rest objects O can be acquired by the same way to be the plurality of intervals. In a second application, the major object O1 can be selected for a start, and the auxiliary objects (which means the objects O2~O12) can be divided at least into a first set close to the object O1 (such as the objects O2~O5 and O9~O10) and a second set distant from the object O1 (such as the objects O6~O8 and O11~O12); then, distances between the object O1 and objects in the first set (which means the objects O2~O5 and O9~O10) can be computed, and all distances between each object and the rest objects can be acquired by the same way to be the plurality of intervals. The second application can lighten a computation quantity of the queue analyzing method in the present invention; a set number and a covering range of each set are not limited to the above-mentioned example, and depend on an actual demand.

Step S404 can be executed to divide the plurality of intervals into several groups. As the example shown in FIG. 5, the histogram has five interval ranges, and a group number may not be identical with an amount of the interval range. In the embodiment, the queue analyzing method can divide the plurality of intervals at least into a first group G1 corresponding to the low interval range and a second group G2 corresponding to the high interval range. The present invention can have an aim of finding out the group with the smallest interval from the plurality of intervals of all the objects O via sample distribution statistics; generally, the group with the smallest interval can correspond to all adjacent objects O. Then, steps S406 and S408 can be executed to compute an interval mean value D_mean and an interval amending value D_amend about some intervals inside the first group G1, and utilize the interval mean value D_mean and the interval amending value D_amend to compute an interval threshold D_th. Final, step S410 can be executed to mark the adjacent objects O conforming to the interval threshold D_th inside the image I, so that a queue and the related objects O can be observed.

In step S406, the intervals of the first group G1 within the same interval range (such as 0~100 centimeters) can be identical with or different from each other, and therefore the interval mean value D_mean can be computed accordingly. In addition, the interval amending value D_amend can be an interval standard deviation or a weighting or any possible modulating value. The present invention provides two computation ways applied for step S408, and an actual application is not limited to the above-mentioned two computation. If the interval amending value D_amend is the interval standard deviation, the interval threshold D_th can be a computation result generated by the weighted interval amending value D_amend and the interval mean value D_mean; the weighting w of the interval amending value D_amend can be adjusted according to parameter variation of the image monitoring apparatus 10, as formula 1. If the interval amending value D_amend is the weighting, the interval threshold D_th can be a weighted result generated by the interval mean value D_mean and the interval amending value D_amend, as formula 2.

$$D\_th = D\_mean + (w \times D\_amend) \qquad \text{Formula 1}$$

$$D\_th = D\_mean \times D\_amend \qquad \text{Formula 2}$$

Figure 6:
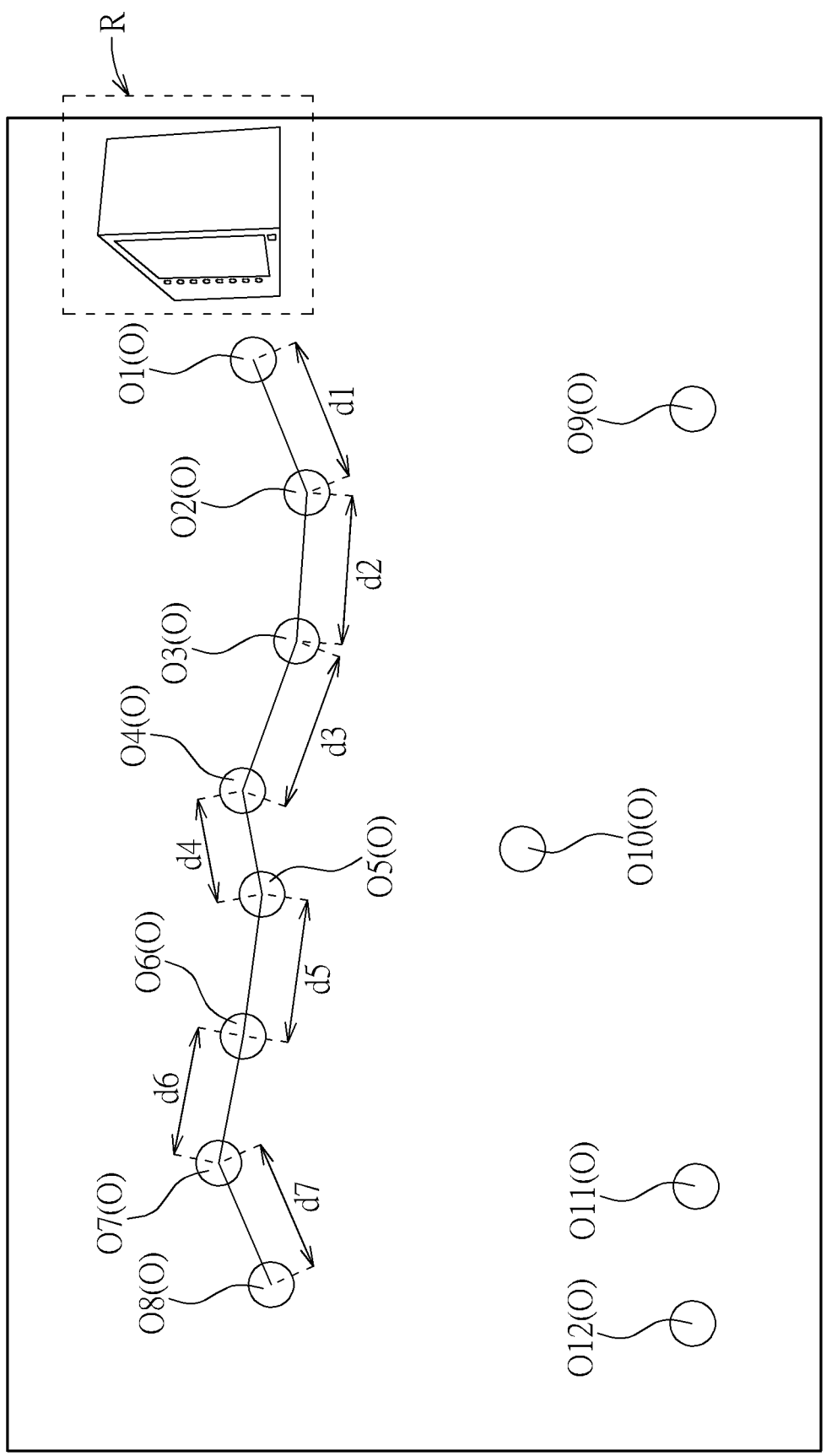
FIG. 6 and FIG. 7 are diagrams of the image having the marked objects according to different embodiments of the present invention.
Figure 7:
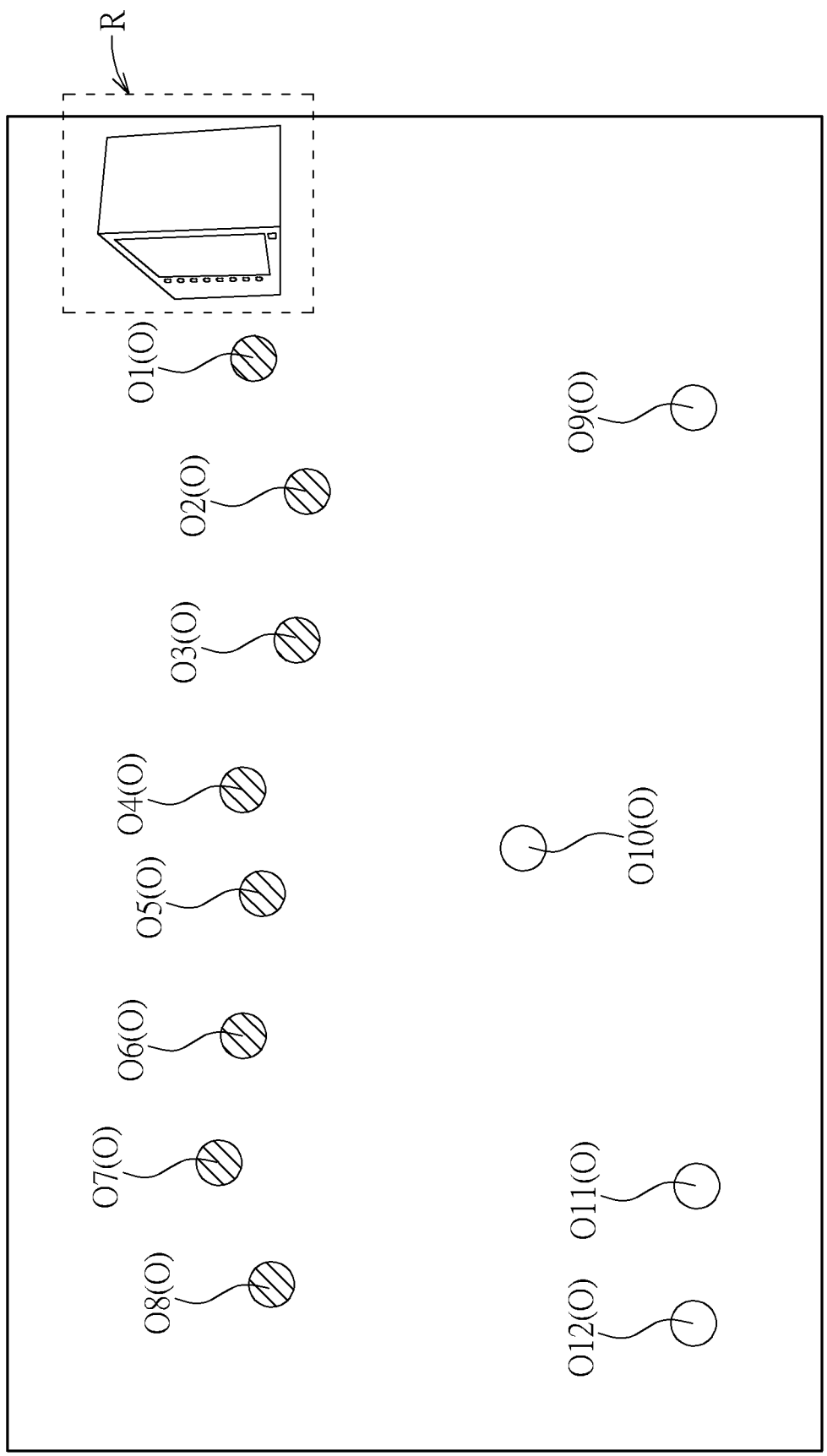

Please refer to FIG. 6 and FIG. 7. FIG. 6 and FIG. 7 are diagrams of the image I having the marked objects O according to different embodiments of the present invention. As shown in FIG. 6, the queue analyzing method can draw a line to connect the adjacent objects O which conform to the interval threshold D_th, and thus the objects O1~O8 can form a queue and the objects O9~O12 distant from the objects O1~O8 do not belong to the said queue. As shown in FIG. 7, the queue analyzing method can mark the objects O which conform to the interval threshold D_th by specific color or patterns, so as to form a queue containing the objects O1~O8 marked by diagonal veins; the color and the patterns can be designed according to the user demand, and other possible application is omitted herein for simplicity. Therefore, the image monitoring apparatus 10 of the present invention can specifically show the objects O conforming to a queue condition on the image I displayed on the user interface (such as a screen of the image monitoring apparatus 10) for visible preview.

The user can determine whether the interval threshold D_th in a current situation conforms to the actual demand according to the preview result of the queue analysis displayed on the user interface. If one object is closed to the objects O1~O8 but not counted into the queue shown in FIG. 6 and FIG. 7, the user can manually adjust and enlarge the interval threshold D_th, and the image monitoring apparatus 10 can mark and display the objects O conforming to the enlarged interval threshold on the user interface. If one object is distant from the objects O1~O8 but counted into the queue shown in FIG. 6 and FIG. 7, the user can manually adjust and reduce the interval threshold D_th, and the image monitoring apparatus 10 can mark and display the updated objects O on the user interface.

The queue analyzing method further can automatically or manually select the objects conforming to the condition threshold in accordance with a computation result of the interval threshold in the present invention, so as to acquire a queue analyzing result with preferred accuracy. For example, the queue analyzing method can optionally execute step S412 after the interval threshold D_th is generated by step S408, to remove some objects O9~O12 which do not conform to the interval threshold D_th, and the surplus objects O1~O8 inside the image I can be used for execution in steps S402~S410; that is to say, objects with low possibility of counting into the queue can be removed automatically, and only objects with high possibility of counting into the queue can be utilized to compute the interval threshold D_th for the preferred accuracy of the queue analyzing result. Or, when the objects O which conform to the interval threshold D_th are marked in step S410, the queue analyzing method can optionally execute step S414 that the user can utilize an input interface (which can be a mouse or a keyboard not shown in the figures) to input a command for reserving some objects (such as the objects O1~O8), and then the reserved objects O1~O8 can be used in steps S402~S410 of the queue analyzing method, which means the user can manually remove objects with the low possibility of counting into the queue so as to acquire the preferred accuracy of the queue analyzing result.

Besides, the queue analyzing method of the present invention can optionally execute step S401, when the objects O inside the image I are all marked, the user can utilize the input interface to input the command, for driving the image monitoring apparatus 10 to draw an indication pattern P on the image I according to the input command, and automatically marking some objects O (such as the objects O1~O8) with distances relative to the indication pattern P conforming to a specific condition. The said specific condition can be an interval value, and an actual value of the specific condition can be set according to the design demand. Thus, the objects O conforming to the specific condition can be used to compute the interval in step S402, and steps S404~S410 can be executed continuously.

The image monitoring apparatus 10 of the present invention can be installed around a counter or a vending machine in the market, for detecting customer queuing information about the counter and the vending machine. The queue analyzing method can further define a region of interest R inside the image I, as shown in FIG. 6 and FIG. 7. Position of the region of interest R may correspond to the counter or the vending machine, and an actual application is not limited to the above example. The queue analyzing method can number the objects O conforming to the interval threshold D_th in sequence based on the region of interest R, such as the objects O1~O8. The queue analyzing result displayed on the screen can be easily previewed so that the user can conveniently determine queuing order of the objects O1~O8 and a total amount of the objects in the queue.

The embodiment shown in FIG. 6 can connect the adjacent objects O1~O8 which conform to the interval threshold D_th via a line, and an actual application is not limited to the foresaid embodiment. For example, when the adjacent objects O1~O8 which conform to the interval threshold D_th are marked, the queue analyzing method may compute actual intervals d1, d2, d3, d4, d5, d6 and d7 between any two adjacent objects inside the objects O1~O8, and display all the actual intervals d1-d7 on the user interface. When the queue analyzing result is previewed, the user can not only watch the objects in the queue, but also density of the queue; thus, the present invention can utilize the queue analyzing method to decide whether the market is crowded, and further decide whether to increase the counter and the clerk for improvement.

Figure 8:
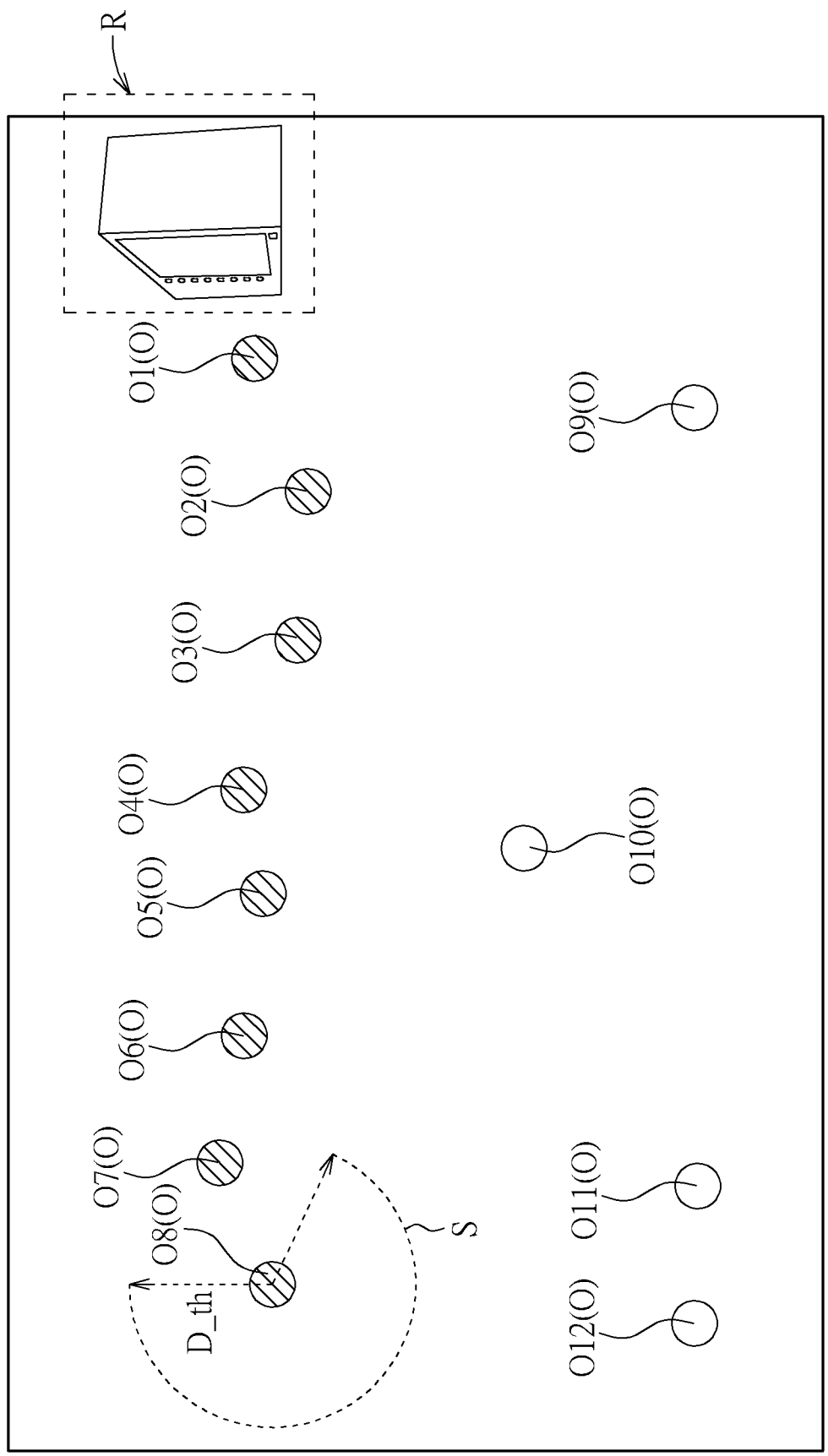
FIG. 8 is a diagram of drawing a stretching region based on the objects of the queue in the image according to the embodiment of the present invention.

Please refer to FIG. 8. FIG. 8 is a diagram of drawing a stretching region S based on the objects O of the queue in the image I according to the embodiment of the present invention. After execution of step S410, the queue analyzing method can find out an ending object of the queue, such as the object O1 or O8; in the embodiment, the object O1 is located nearby the vending machine, which means the region of interest R shown in FIG. 6, so that the queue analyzing method preferably can set the object O8 being the ending object of the queue. Then, the queue analyzing method can utilize the interval threshold D_th to generate the stretching region S on the image I, based on the ending object O8. The stretching region S does not overlap with the objects which do not conform to the interval threshold D_th (such as the objects O9~O12). When the queue analyzing result is previewed, the user can decide density of the queue and the objects O not conforming to the interval threshold D_th via the stretching region S. It should be mentioned that the embodiment shown in FIG. 8 sets the object O8 as a center of the circle and the interval threshold D_th as a radius of the circle, so as to generate a fan-shaped region as the stretching region S, and an actual application of the stretching region S is not limited to the above-mentioned embodiment.

In conclusion, the image monitoring apparatus and the queue analyzing method of the present invention utilizes statistic result about object intervals to sift out the interval corresponding to the low interval range, and the interval corresponds to the low interval range can be used to compute the interval threshold. Therefore, the objects distant from the queue can be excluded by the queue analyzing method, and only the intervals between the adjacent objects in the queue can be used to automatically provide the proper interval threshold, and to ensure correct of the queue analyzing result. Besides, the image monitoring apparatus can display the queue analyzing result on the screen, so that the user can clearly watch an effect of the interval threshold generated by the queue analyzing method, and may manually adjust the interval threshold according to personal habit, or remove some objects for automatic adjustment of the preferred interval threshold, or reserve some objects for utilizing the reserved objects to generate the preferred interval threshold, or draw the region of interest and/or the stretching region in the image for easily determining relation between each object and the whole queue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A queue analyzing method of automatically generating an interval threshold for queue analysis in accordance with position variation of objects, the queue analyzing method comprising:

computing a plurality of intervals between all the objects inside an image;

dividing the plurality of intervals at least into a first group corresponding to a low interval range and a second group corresponding to a high interval range;

computing an interval mean value and an interval amending value of objects inside the first group;

utilizing the interval mean value and the interval amending value to generate the interval threshold; and marking adjacent objects conforming to the interval threshold inside the image.

2. The queue analyzing method of claim 1, wherein computing the plurality of intervals between all the objects inside the image comprises:

defining a major object and other auxiliary objects inside the image;

dividing the auxiliary objects at least into a first set close to the major object and a second set distant from the major object; and computing intervals between the major object and all objects inside the first set for being the plurality of intervals.

3. The queue analyzing method of claim 1, wherein the interval amending value is an interval standard deviation, and the interval threshold is a computation result generated by the interval standard deviation and the interval mean value.

4. The queue analyzing method of claim 1, wherein the interval amending value is a weighting, and the interval threshold is a weighted result generated by the weighting and the interval mean value.

5. The queue analyzing method of claim 1, further comprising:

removing some objects not conforming to the interval threshold; and utilizing surplus objects inside the image to acquire the plurality of intervals and the related interval threshold.

6. The queue analyzing method of claim 1, further comprising:

reserving some objects inside the image according to an input command; and utilizing the reserved objects to acquire the plurality of intervals and the related interval threshold.

7. The queue analyzing method of claim 1, further comprising:

drawing an indication pattern inside the image according to an input command;

marking several objects with distances relative to the indication pattern conforming to a specific condition; and utilizing the marked objects to acquire the plurality of intervals and the related interval threshold.

8. The queue analyzing method of claim 1, further comprising:

defining a region of interest inside the image; and numbering the adjacent objects conforming to the interval threshold in sequence based on the region of interest.

9. The queue analyzing method of claim 1, further comprising:

computing and displaying an actual interval between the adjacent objects when the adjacent objects conforming to the interval threshold are marked.

10. The queue analyzing method of claim 1, further comprising:

marking the adjacent objects conforming to the interval threshold to form a queue;

defining at least one ending object in the queue; and generating a stretching region via the interval threshold inside the image based on the at least one ending object.

11. An image monitoring apparatus, comprising:

an image receiver adapted to receive an image; and an operation processor electrically connected to the image receiver and adapted to analyze the image for finding all objects, the operation processor being further adapted to compute a plurality of intervals between all the objects inside an image, divide the plurality of intervals at least into a first group corresponding to a low interval range and a second group corresponding to a high interval range, compute an interval mean value and an interval amending value of objects inside the first group, utilize the interval mean value and the interval amending value to generate the interval threshold, and mark adjacent objects conforming to the interval threshold inside the image.

12. The image monitoring apparatus of claim 11, wherein the operation processor is further adapted to define a major object and other auxiliary objects inside the image, divide the auxiliary objects at least into a first set close to the major object and a second set distant from the major object, and compute intervals between the major object and all objects inside the first set for being the plurality of intervals.

13. The image monitoring apparatus of claim 11, wherein the interval amending value is an interval standard deviation, and the interval threshold is a computation result generated by the interval standard deviation and the interval mean value.

14. The image monitoring apparatus of claim 11, wherein the interval amending value is a weighting, and the interval threshold is a weighted result generated by the weighting and the interval mean value.

15. The image monitoring apparatus of claim 11, wherein the operation processor is further adapted to remove some objects not conforming to the interval threshold, and utilize surplus objects inside the image to acquire the plurality of intervals and the related interval threshold.

16. The image monitoring apparatus of claim 11, wherein the operation processor is further adapted to reserve some objects inside the image according to an input command, and utilize the reserved objects to acquire the plurality of intervals and the related interval threshold.

17. The image monitoring apparatus of claim 11, wherein the operation processor is further adapted to draw an indication pattern inside the image according to an input command, mark several objects with distances relative to the indication pattern conforming to a specific condition, and utilize the marked objects to acquire the plurality of intervals and the related interval threshold.

18. The image monitoring apparatus of claim 11, wherein the operation processor is further adapted to define a region of interest inside the image, and number the adjacent objects conforming to the interval threshold in sequence based on the region of interest.

19. The image monitoring apparatus of claim 11, wherein the operation processor is further adapted to compute and displaying an actual interval between the adjacent objects when the adjacent objects conforming to the interval threshold are marked.

20. The image monitoring apparatus of claim 11, wherein the operation processor is further adapted to mark the adjacent objects conforming to the interval threshold to form a queue, define at least one ending object in the queue, and generate a stretching region via the interval threshold inside the image based on the at least one ending object.

* * * * *